(12) United States Patent
Jen

(10) Patent No.: US 8,735,482 B2
(45) Date of Patent: May 27, 2014

(54) POLYESTER RESIN CONTAINING TUNGSTEN—TITANIUM CARBIDE PARTICLES AND POLYESTER PREFORM MADE THEREFROM

(75) Inventor: Zo-Chun Jen, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 155 days.

(21) Appl. No.: 13/407,940

(22) Filed: Feb. 29, 2012

(65) Prior Publication Data

US 2012/0232205 A1    Sep. 13, 2012

(30) Foreign Application Priority Data

Mar. 7, 2011    (TW) .............................. 100107501 A

(51) Int. Cl.
C08K 3/14    (2006.01)

(52) U.S. Cl.
USPC .......................................... 524/406

(58) Field of Classification Search
USPC .......................................... 524/406
See application file for complete search history.

(56) References Cited

PUBLICATIONS

Derwent abstract of CN 102153839, Aug. 2012.*

* cited by examiner

Primary Examiner — Doris Lee
(74) Attorney, Agent, or Firm — Bacon & Thomas, PLLC

(57) ABSTRACT

A polyester resin containing tungsten-titanium carbide particles having a weight ratio (W/Ti) of tungsten (W) to titanium (Ti) ranging between 5:5 and 7:3 is suitable to produce PET preforms possessed excellent infrared-absorbing capability, and the polyester resin as well as preforms and bottles made from the polyester resin are clearer and have good and less yellowish appearances.

6 Claims, No Drawings

POLYESTER RESIN CONTAINING TUNGSTEN—TITANIUM CARBIDE PARTICLES AND POLYESTER PREFORM MADE THEREFROM

BACKGROUND OF THE PRESENT INVENTION

1. Field of the Present Invention

The present invention relates to a polyester resin containing tungsten-titanium carbide particles, more particularly, to a polyester preform made from the polyester resin is of high clarity and low haze while being more capable of absorbing near infrared, thereby facilitate saving energy consumed in a subsequent bottle blowing process.

2. Description of Related Art

Polyesters, particularly polyethylene terephthalate (also known as PET), are usually used to make plastic bottles for packing beverages and foods for the reason that such PET polyester bottles have outstanding strength, transparency and chemical resistance.

A process for making a polyester bottle is as described below. First, a polyester resin as the material is made through polycondensation reaction. The polyester resin is then melt and injected into preform mold cavities, as the known injection molding procedure, and thus forms a preform after cooling. Afterward, the preform is heated by infrared lamps to a temperature higher than the polyester's glass transition temperature, which is about 20-40▢, before sent to the blowing mold and blown into a bottle through a conventional mold blowing procedure.

Currently, preforms are industrially processed through infrared heating, which is typically enabled by quartz infrared lamps, after which the softened PET preforms are placed in molds for a stretch blow moulding process where they are formed into bottles.

The reason for using quartz infrared lamps as the heating source for PET preforms is that infrared rays go through PET preform in a radiative manner, so that PET molecules can be evenly heated by cyclotron resonance, leading to temperature harmonization between the inside and outside of the entire preforms. Otherwise, an unevenly heated PET preform can generate crystals that cause haze during the stretch blow moulding process.

While a quartz infrared lamp typically has a maximum wavelength of 1100-1200 nm, the PET resin under structural resonance can only absorb energy of 5500-10000 nm, which is in the far-infrared region and much different from the near-infrared region in which the radiation emitted by the quartz infrared lamp ranges.

Since near infrared as energy produced by quartz infrared lamps is less absorbable to PET preforms, more time is required for heating PET preforms before temperature harmonization between the inside and outside of the entire preforms is achieved. Thus, shortcomings resulted by using quartz infrared lamps to heat PET preforms include decreased bottle-blowing efficiency and increased energy consumption.

To solve these problems, many approaches have been proposed recently for improving PET's absorption of infrared rays, with the particularly attempt to make PET preforms absorb near infrared with a wavelength ranging between 1100 and 1200 nm better. Just a few are named below.

U.S. Pat. No. 4,408,004 has taught that the addition of carbon black, as an infrared absorbent material, in a polycondensed resin, reduces the heat-up time required by PET preforms, wherein the carbon black has an average particle size of 10-500 nm and the carbon black is present from 0.1 to 10 ppm by weight of said polyester.

U.S. Pat. No. 5,529,744 disclosed the technique of using gray antimony to improve PET preforms in infrared absorption. The gray antimony as proposed is made by adding a phosphorus (III) reducing agent of during the polycondensation process, so that the trivalent antimony ions, after reacted with a catalyst, can be reduced into the desired gray antimony.

U.S. Pat. No. 6,022,920 uses black iron oxide particles to absorb infrared rays for shortening the time for heating PET preforms, wherein the black iron oxide particle each have a particle size of 0.1-10 μm, and are in the concentration of 5-50 ppm.

U.S. Pat. No. 6,034,167, on the other hand, used graphite as the component for absorbing infrared rays for the same purpose of heating PET preforms fast, wherein the graphite added has a particle size of 0.1-20 μm and a concentration of 0.1-15 ppm.

U.S. Pat. No. 6,503,586 has disclosed the use of inorganic black particles, such as copper chromite spinel, to absorb infrared rays, for reducing the heating time for PET preforms, wherein the inorganic black particles each have a particle size of 0.5-200 μm and are in a concentration of 3-170 ppm.

US Patent Application No, 2006105129 proposes the use of titanium carbide as particles for absorbing infrared, thereby reducing time consumption for heating up PET preforms, wherein the titanium carbide has a particle size of 0.005-100 μm, and a concentration of 0.5-1000 ppm.

WO 2006/055198 also uses titanium carbide to make PET preforms absorb near infrared better.

The above-mentioned prior-art techniques all depend on adding either black or grey inert particles in PET resin to make preforms absorb near infrared better. However, these approaches can unavoidably cause the resultant PET preforms and bottles to become less clear to the extent that they are undesired by beverage manufacturers.

SUMMARY OF THE INVENTION

In view of this, a primary objective of the present invention is to provide a polyester resin containing tungsten-titanium carbide particles, which is excellent in absorbing infrared rays, so as to save time and energy consumption required by heating PET preforms made form the polyester resin, with advantages that preforms and bottles made form the polyester resin are of high clear, being suitable PET preforms and PET bottles for industrial applications.

The disclosed polyester resin implements tungsten-titanium carbide as the substance that absorbs infrared rays. The tungsten-titanium carbide particles contained therein have a particle size of 0.01-10 μm, a weight ration between tungsten and titanium components of 5:5-7:3, and a concentration of 5-120 ppm based on the polyester resin's weight.

The disclosed polyester preform is made from the above-mentioned polyester resin, with an infrared-absorbing capability meeting $(T_H-T_O)/(L_O-L_H) \geq 1.0$, so as of help reducing time required by heating the PET preform. In the foregoing formula, $T_H$ is the polyester preform's temperature measured before its entering a bottle-blowing mold; $T_O$ is a temperature of a polyester preform without tungsten-titanium carbide particles measured before its entering a bottle-blowing mold; $L_H$ is the polyester preform's Hunter L value; and $L_O$ is a Hunter L value of the polyester preform without tungsten-titanium carbide particles.

DETAILED DESCRIPTION OF THE PREFERRED EMBODIMENTS

According to the present invention, a polyester resin implements tungsten-titanium carbide as the substance for absorbing infrared rays, thus enabling a PET preform made therefrom to have an improved near-infrared-absorbing capability, and to be made into a polyester bottle with enhanced clarity and hue.

In the present invention, Hunter L values are measured as indicators for evaluating clarity of polyester grains and polyester preforms. A higher L value suggests superior clarity, while a lower one denotes an inferior clarity.

The inventive polyester resin is a polyester composition made with tungsten-titanium carbide particles and meeting description of following Formula (I):

$$(T_H - T_O)/(L_O - L_H) \geq 1.0 \quad \text{Formula (I)}$$

Therein, the polyester resin when made into a PET preform, has a Hunter L value represented by $L_H$, and when heated by quartz infrared lamps for a certain period of time, the preform has a measured temperature of $T_H$° C. On the other hand, a controlled polyester resin is a PET resin without any near-infrared absorbent, which made into a PET preform, has a Hunter L value represented by $L_O$, and when heated by quartz infrared lamps for a certain period of time the preform has a measured temperature of $T_O$° C.

The higher the ratio is in Formula (I), the better efficiency where the polyester preform made from the disclosed polyester resin absorbs infrared rays is.

On the contrary, where the ratio in Formula (I) is lower than 1, inferior efficiency where a polyester preform absorbs infrared rays is suggested. For example, a PET resin with ferriferrous oxide particles has a ratio according to Formula (I) of 0.8-0.9. In another example, a PET resin with carbon black has a ratio according to Formula (I) of 0.5-0.6.

The disclosed polyester resin is made by preparing a plasma from a dicarboxylic acid and a dial, and esterifying the plasma. Another way to make the same is performing trans-esterification between an esterified product of a dicarboxylic acid and a diol with the presence of a catalyst, and undergoing an oligomer monomer, as a product of the precious trans-esterification, through a melt polycondensation process in vacuum, so as to obtain a prepolymer with an intrinsic viscosity of 0.45-0.65 dl/g, which is then treated by solid state polycondensation to form a polymer having its viscosity higher than 0.7 dl/g. However, the disclosed polyester resin may be made by reacting two or more dicarboxylic acids with two or more diols.

The suitable dicarboxylic acids include but are not limited to iso-phthalic acid, succinic acid, glutaric acid, adipic acid, sebacic acid, naphthalic acid and any combination thereof.

The suitable diols include but are not limited to diethylene glycol; 1,3-propanediol; 1,4-butanediol; 1,4-cyclohexanedimethanol, and any combination thereof.

The polyester resin of the present invention may be made through a process known in the art. To prepare the polyester resin, terephthalic acid and ethylene glycol are first esterified at 210-270° C. to form an oligomer monomer, and ethylene glycol, diethylene glycol and water as products of a side reaction. Then the gaseous by-products are isolated and guided to a distillation tower. The isolated ethylene glycol can be recycled and water is led to a waste water treatment system for further treatment. The stage of esterification can be performed with or without a catalyst. The oligomer monomer obtained after esterification is then sent to a vacuum reaction tank for a polycondensation reaction. Prior to the reaction, a catalyst for polycondensation, a thermal stabilizer and trace pigment have to be added. The polycondensation reaction under vacuum is composed of prepolymerization and bulk polymerization, wherein the former is performed at 260-280° C. and 250-10 mmHg, while the latter is performed at 270-290° C. and high vacuum smaller than 1 mmHg. At the end of the melt polycondensation reaction, the polymer has its intrinsic viscosity of 0.45-0.65 dl/g, and preferably 0.55-0.60. The polymer is extruded as strands into cooling water for rapid cooling, and cut into grains.

According to the present invention, the tungsten-titanium carbide particles, before added, are dissolved in ethylene glycol as a solution. The solution then can be introduced anytime through the process from the plasma of terephthalic acid to the grains, and preferably during a period after the esterification stage and before the polycondensation reaction in vacuum. The tungsten-titanium carbide particles are as a whole added in an amount of 5-120 ppm, preferably of 15-100 ppm, and most preferably of 30-60 ppm, all based on the polyester resin's weight.

The tungsten-titanium carbide particles as used in the present invention are made from processing a Ti-containing oxide and a W-containing oxide, together with graphite, through carbothermal reduction method under high temperature.

The tungsten-titanium carbide particles such made have a particle size of 0.01-10 μm, and preferably if 0.01-1 μm.

The disclosed tungsten-titanium carbide particles as a whole in the resin have a weight ratio between tungsten and titanium of 7:3-5:5, and preferably 7:3, excluding a ratio where tungsten:titanium=5:5.

The suitable catalyst for the melt polycondensation reaction, as described in the present invention, may be antimony acetate, antimony trioxide, tetrabutyl titanium or any titanium catalyst providing catalysis, or a catalyst as any combination of theses catalysts. The thermal stabilizer useable may be phosphoric acid, phosphorous acid, trimethyl phosphate, triethyl phosphate or triphenyl phosphate.

The disclosed polyester resin, according to practical needs, maybe further added with a light stabilizer, a pigment, an anti-oxidant, an anti-adherent, an acetaldehyde absorbent and/or an oxygen absorbent.

The pre-polymerization grains obtained after the melt polymerization process are subject to solid state polycondensation, as known in the art, so as to increase its intrinsic viscosity to 0.70 dl/g. The solid state polycondensation process involves heating crystallized, dried resin grains to a temperature 20-50° C. lower than the melting point of the polyester resin, and removing by-products of solid state polycondensation such as ethylene glycol by nitrogen circulation, wherein the intrinsic viscosity increases as the hold time of solid state polymerization increases.

The polyester resin, after solid state polycondensation, preferably has an intrinsic viscosity of 0.70-0.92 dl/g, and more preferably has an intrinsic viscosity of 0.72-0.88 dl/g.

The polyester resin of the present invention may be made through a new melt polymerization process, where the intrinsic viscosity is directly increased to 0.70 dl/g, without performing solid state polycondensation.

The following examples are provided to illustrate the present invention without limiting the scope of the present invention.

Methodology for Analyzing Intrinsic Viscosity:

A Ubelohde viscometer was used for measurement. The polyester resin was dissolved in a nixed solvent made with phenol and tetrachloroethane with a weight ratio therebetween of 3:2 and measured at constant 25° C.

Methodology for Analyzing Clarity:

The polyester resin, preform or bottle was measured for clarity with a Hunter device. The higher the measured L value of the polyester resin was, the whiter the polyester resin was, and the lower the L value was, the blacker the polyester resin was. As to the polyester preform or bottle, a higher L value indicated that the appearance of the preform or bottle was clearer, while a lower L value indicated that the appearance of the preform or bottle was less clear and less transparent.

Methodology for Evaluating Preform's Heat-Absorbing Capability:

The polyester resin was dried to a moisture content lower than 50 ppm, and molded into a preform with a Nissei Plastic Injection Molding Machine molded ASB-50, whose melter was set at 280° C. with a preform mold cooled by 12□ chilling water. Then a Krupp Corpoplast LB-Type Stretch Blow Moulding Machine with quartz heating lamps (power of 1200-1600 W) was used. The preform was placed close to the lamps to be heated for 20 seconds with the lamps 80% opened. The increased temperature was held for 7 seconds. The preform was measured for its surface temperature before entering the bottle-blowing mold, and got blown into a bottle as soon as it entered the bottle mold.

Example 1

An electric, 30 L, stainless-steel reactor was provided, in which 10.81 Kg BHET oligomer monomer (obtained form a commercial continuous PTA esterification tank), and 3.23 Kg ethylene glycol were added for reaction under 1-1.5 Kg and up to 260° C. The by-products such as ethylene glycol and water were isolated by distillation, wherein some ethylene glycol might backflow for further reaction. After 1.5 hr of reaction, the following substances were added in order: phosphoric acid, 60 ppm; antimony acetate as a polycondensation catalyst, 450 ppm; blue and red dyes, 1 ppm and 0.5 ppm; and tungsten-titanium carbide, with a particle size of 1.0-1.5 μm, a W/Ti ratio=7:3, 15 ppm; all based on the polyester resin's weight.

The reactor was vacuumed to an internal pressure lower than 1 mmHg, heated to 270° C. for pre-polymerization, and further heated to 280□ for bulk polymerization. As the reaction time and temperature increased, the viscosity of the resultant polymer increased. When the intrinsic viscosity reached 0.60 dl/g, the polymer was output and cut into resin grains.

The resin grains were put in a rotatory vacuum solid-state polymerization tank to undergo pre-crystallization at 180° C. first, and then a solid-state polymerization reaction at 220° C. for increasing the intrinsic viscosity to 0.70 dl/g or higher.

The resultant resin was made into a 55-g preform by using the Nissei Injection Molding Machine molded ASB-50, with the setting of 280° C. plasticizing temperature. The preform was checked for L value.

Then the Krupp Corpoplast LB01 Stretch Blow Moulding Machine with quartz heating lamps 80% opened was used to heat the preform for 20 seconds. The increased temperature was held for 7 seconds. The preform had a surface temperature of 115° C. before entering the bottle-blowing mold. It got blown into a 2 L bottle as soon as it entered the bottle mold.

The resin and preform such made were checked for clarity and the preform was measured for its heat absorbing capability. The results are listed in Table 1.

Example 2

Similar to Example 1, except that the content of the tungsten-titanium carbide was changed to 28 ppm based on the polyester resin. The preform's surface temperature before its entering the bottle-blowing mold was measured as 117° C.

The resin and preform such made were checked for clarity and the preform was measured for its heat absorbing capability. The results are listed in Table 1.

Example 3

Similar to Example 1, except that the content of the tungsten-titanium carbide was changed to 55 ppm based on the polyester resin. The preform's surface temperature before its entering the bottle-blowing mold was measured as 123° C.

The resin and preform such made were checked for clarity and the preform was measured for its heat absorbing capability. The results are listed in Table 1.

Example 4

Similar to Example 1, except that the content of the tungsten-titanium carbide was changed to 75 ppm based on the polyester resin. The preform's surface temperature before its entering the bottle-blowing mold was measured as 128° C.

The resin and preform such made were checked for clarity and the preform was measured for its heat absorbing capability. The results are listed in Table 1.

Comparative Example 1

Similar to Example 1, except that no near infrared absorbent was added. The preform's surface temperature before its entering the bottle-blowing mold was measured as 110° C.

The resin and preform such made were checked for clarity and the preform was measured for its heat absorbing capability. The results are listed in Table 1.

Comparative Example 2

Similar to Example 2, except that the added tungsten-titanium carbide had a W/Ti ratio of 5:5. The preform's surface temperature before its entering the bottle-blowing mold was measured as 116° C.

The resin and preform such made were checked for clarity and the preform was measured for its heat absorbing capability. The results are listed in Table 1.

Comparative Example 3

Similar to Example 1, except that the near infrared absorbent used was black ferriferrous oxide particles of 28 ppm based on the polyester resin. The preform's surface temperature before its entering the bottle-blowing mold was measured as 118° C.

The resin and preform such made were checked for clarity and the preform was measured for its heat absorbing capability. The results are listed in Table 1.

Comparative Example 4

Similar to Example 1, except that the near infrared absorbent used was black ferriferrous oxide particles of 55 ppm based on the polyester resin. The preform's surface temperature before its entering the bottle-blowing mold was measured as 121° C.

The resin and preform such made were checked for clarity and the preform was measured for its heat absorbing capability. The results are listed in Table 1.

Comparative Example 5

Similar to Example 1, except that the near infrared absorbent used was black titanium carbide particles of 28 ppm based on the polyester resin. The preform's surface temperature before its entering the bottle-blowing mold was measured as 116° C.

The resin and preform such made were checked for clarity and the preform was measured for its heat absorbing capability. The results are listed in Table 1.

Comparative Example 6

Similar to Example 1, except that the near infrared absorbent used was blue antimony tin oxide particle of 28 ppm based on the polyester resin. The preform's surface temperature before its entering the bottle-blowing mold was measured as 113° C.

Results:

By comparing the results of Examples 1-4 and Comparative Examples 1-6 as shown in Table 1, the following conclusions are made:

1. The PET polyesters of Examples 1 through 4 were made with tungsten-titanium carbide particles having particle sizes of 1.0-1.5 μm, all of a W/Ti ratio of 7:3, and in amounts of 15-75 ppm based on the polyester resin. According to the L values shown in Table 1, the PET polyesters had good, less yellowish appearances.

Furthermore, the PET polyester grains, when processed into PET preforms, according to the heat-absorbing capability values (I) of Table 1, possessed excellent infrared-absorbing capability, so as being helpful to reduce the time and energy required by heating the PET preforms. According to the $L_H$ values of the preforms as shown in Table 1, the preforms and bottles were clearer and thus suitable to be used as PET preforms and PET bottles.

2. The PET polyester of Comparative Example 1 contained no near infrared absorbent, so the preform had the pre-mold surface temperature of 115° C., lower than those for Examples 1 through 4, indicating that the preform of Comparative Example 1 had relatively inferior infrared-absorbing capability, meaning it consumed more energy from the lamps.

3. According to the resins' L values and preform' $L_H$ values of Table 1, although the PET polyester of Comparative Example 2 had tungsten-titanium carbide particles with the particle size of 1.0-1.5 μm, its W/Ti ratio 5:5, as compared with 7:3 for Example 2, led to relatively inferior infrared-absorbing capability, meaning it consumed more energy from the lamps.

4. According to the resins' L values and preform' $L_H$ values of Table 1, Comparative Examples 4-6 added ferriferrous oxide particles, titanium carbide particles or antimony tin oxide particles in the PET resins, as compared with the PET polyesters of Examples 1 through 4, their preforms had relatively inferior infrared-absorbing capability, meaning it consumed more energy from the lamps.

TABLE 1

| | NIR Absorbent | NIR Absorbent Content (ppm) | Resin L value; (b) value | Preform $L_H$ Value | Preform Temperature ($T_H$ °C.) | $(I) = \dfrac{T_H - T_O}{L_O - L_H}$ |
|---|---|---|---|---|---|---|
| Example 1 | WTiC (W/Ti = 7/3) | 15 | 74.5 (3.3) | 71.7 | 115 | 1.35 |
| Example 2 | WTiC (W/Ti = 7/3) | 28 | 72.7 (3.2) | 70.0 | 117 | 1.30 |
| Example 3 | WTiC (W/Ti = 7/3) | 55 | 69.7 (1.9) | 66.9 | 123 | 1.53 |
| Example 4 | WTiC (W/Ti = 7/3) | 75 | 67.3 (1.7) | 64.6 | 128 | 1.67 |
| Comparative Example 1 | — | 0 | 78.0 (2.5) | 75.4 ($L_O$) | 110 ($T_O$) | — |
| Comparative Example 2 | WTiC (W/Ti = 5/5) | 28 | 71.5 (4.2) | 68.9 | 116 | 0.92 |
| Comparative Example 3 | $Fe_3O_4$ | 28 | 68.9 (2.8) | 65.9 | 118 | 0.84 |
| Comparative Example 4 | $Fe_3O_4$ | 55 | 64.9 (2.2) | 61.8 | 121 | 0.80 |
| Comparative Example 5 | TiC | 28 | 70.5 (2.6) | 67.6 | 116 | 0.77 |
| Comparative Example 6 | Antimony Tin Oxide (ATO) | 28 | 73.4 (4.1) | 70.6 | 113 | 0.63 |

What is claimed is:

1. A polyester resin suitable to produce PET preforms possessed excellent infrared-absorbing capability, having an intrinsic viscosity of 0.72-0.88 dl/g and comprising a blend of PET polyester as a main component and 5-120 ppm of tungsten-titanium carbide particles by weight of the polyester resin, and the tungsten-titanium carbide particle has a weight ratio (W/Ti) of tungsten element (W) to titanium element (Ti) ranging between 5:5 and 7:3.

2. The polyester resin as defined in claim 1, wherein the polyester resin comprises 30-60 ppm of tungsten-titanium carbide particles by weight of the polyester resin.

3. The polyester resin as defined in claim 1, wherein the tungsten-titanium carbide particle has a particle size of 0.01-10 μm.

4. The polyester resin as defined in claim 2, wherein the tungsten-titanium carbide particle has a particle size of 0.01-1 μm.

5. A polyester preform possessed excellent infrared-absorbing capability is made of the polyester resin as defined in claim 1.

6. The polyester preform as defined in claim 5, having an infrared-absorbing capability satisfied the following formula (I):

$$(T_H - T_O)/(L_O - L_H) \geq 1.0 \quad \text{formula (I)},$$

where $T_H$ is a temperature of the polyester preform before the polyester preform enters a bottle-blowing mold; $T_O$ is a temperature of a polyester preform without tungsten-titanium carbide particles before the polyester preform enters a bottle-blowing mold; $L_H$ is a Hunter L value of the polyester preform; and $L_O$ is a Hunter L value of the polyester preform without tungsten-titanium carbide particles.

* * * * *